United States Patent
Kamimura et al.

(10) Patent No.: US 12,460,043 B2
(45) Date of Patent: Nov. 4, 2025

(54) EPOXY RESIN COMPOSITION FOR FIBER-REINFORCED COMPOSITE MATERIAL, PREPREG, AND FIBER-REINFORCED COMPOSITE MATERIAL

(71) Applicant: The Yokohama Rubber Co., LTD., Tokyo (JP)

(72) Inventors: Yukihiro Kamimura, Kanagawa (JP); Tomohiro Ito, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 484 days.

(21) Appl. No.: 17/995,896

(22) PCT Filed: Dec. 23, 2020

(86) PCT No.: PCT/JP2020/048142
§ 371 (c)(1),
(2) Date: Oct. 10, 2022

(87) PCT Pub. No.: WO2021/210219
PCT Pub. Date: Oct. 21, 2021

(65) Prior Publication Data
US 2023/0183416 A1 Jun. 15, 2023

(30) Foreign Application Priority Data
Apr. 15, 2020 (JP) .................. 2020-072680

(51) Int. Cl.
| | |
|---|---|
| *C08J 5/24* | (2006.01) |
| *C08G 59/22* | (2006.01) |
| *C08G 59/38* | (2006.01) |
| *C08G 59/40* | (2006.01) |
| *C08G 59/50* | (2006.01) |
| *C08G 59/56* | (2006.01) |
| *C08G 59/60* | (2006.01) |
| *C08J 5/04* | (2006.01) |

(52) U.S. Cl.
CPC ............. *C08G 59/38* (2013.01); *C08G 59/22* (2013.01); *C08G 59/4021* (2013.01); *C08G 59/5033* (2013.01); *C08G 59/5073* (2013.01); *C08J 5/042* (2013.01); *C08J 5/043* (2013.01); *C08J 5/046* (2013.01); *C08J 5/243* (2021.05); *C08J 5/244* (2021.05); *C08J 5/246* (2021.05); *C08J 2363/00* (2013.01)

(58) Field of Classification Search
None
See application file for complete search history.

(56) References Cited

U.S. PATENT DOCUMENTS

| | | | |
|---|---|---|---|
| 10,988,589 B2 | 4/2021 | Teranishi et al. | |
| 11,618,803 B2 | 4/2023 | Teranishi et al. | |
| 2005/0163989 A1* | 7/2005 | O'Byrne | C08J 5/249 |
| | | | 428/292.1 |
| 2016/0046760 A1* | 2/2016 | Qin | C08J 11/24 |
| | | | 549/451 |
| 2017/0368800 A1* | 12/2017 | Liang | B32B 19/02 |
| 2020/0308356 A1* | 10/2020 | Balijepalli | C08G 59/5026 |
| 2021/0024713 A1 | 1/2021 | Sasaki et al. | |

FOREIGN PATENT DOCUMENTS

| | | | |
|---|---|---|---|
| CN | 113789034 A | * | 12/2021 |
| JP | 2004-346092 A | | 12/2004 |
| JP | 2011-099094 A | | 5/2011 |
| JP | 2019-156982 A1 | | 9/2019 |
| WO | 2016/159147 A1 | | 10/2016 |
| WO | WO 2019/098028 A1 | | 5/2019 |

OTHER PUBLICATIONS

Machine translation of CN-113789034-A (no date).*

* cited by examiner

*Primary Examiner* — Michael J Feely
(74) *Attorney, Agent, or Firm* — Thorpe North & Western

(57) ABSTRACT

An epoxy resin composition for a fiber-reinforced composite material includes: (a) one or more epoxy resins; (b) an aromatic diamine compound; (c) a dicyandiamide; (d) a urea compound; and (e) an amine adduct compound, blended in specific ranges.

12 Claims, No Drawings

EPOXY RESIN COMPOSITION FOR FIBER-REINFORCED COMPOSITE MATERIAL, PREPREG, AND FIBER-REINFORCED COMPOSITE MATERIAL

TECHNICAL FIELD

The present technology relates to an epoxy resin composition for a fiber-reinforced composite material, a prepreg, and a fiber-reinforced composite material.

BACKGROUND ART

Epoxy resins have traditionally been the mainstream as matrix resins for carbon fibers and glass fiber-reinforced composite materials (FRPs) applied to aircraft and the like, and are applied to many of body structures. For example, Japan Unexamined Patent Publication No. 2011-099094 A describes an epoxy resin composition containing an epoxy resin as a matrix, a thermoplastic resin for viscosity adjustment, a filler, and a curing agent, and also describes a prepreg obtained by combining the composition and a reinforcing fiber.

Heat resistance requirements of the aircraft are determined according to the site, and are roughly classified into, for example, approximately 95° C. (or higher) and approximately 70° C. Blending of the epoxy resin composition corresponding to these requirements can be classified into blending through curing at 180° C. and blending through curing at 120° C., and 180° C.-cured products and 120° C.-cured products are obtained at the curing temperatures.

On the other hand, it has been pointed out that FRP requires a high manufacturing cost. Especially, a process of curing and molding a prepreg by an autoclave through use of machine or hand lay-up requires high costs for many auxiliary materials used for bagging before curing, high autoclave equipment management cost, and high energy cost, and such high costs are considered to be the main factors to raise the manufacturing cost. Therefore, investigation and development of methods for manufacturing an FRP without using a prepreg or autoclave, such as filament winding (FW) and resin transfer (RTM) molding methods, have also been actively made. However, in terms of quality reproducibility and reliability of manufactured parts, it has not been possible to achieve a level equal to or higher than that of the hand lay-up-autoclave prepreg molding method. The manufacturing cost when using an autoclave increases in proportion to the curing temperature, pressure, and time. Therefore, when a prepreg material that can be cured at as a low temperature and a low pressure as possible can be applied, the cost for manufacturing by an autoclave, which is currently the most reliable, can be reduced. For example, when the process currently divided into curing at 120° C. and curing at 180° C. can be unified into curing at 120° C. curing on a low temperature side, the efficiency of curing by an autoclave can be improved, which can contribute greatly to reduction of the manufacturing cost.

SUMMARY

The present technology provides an epoxy resin composition for a fiber-reinforced composite material, a prepreg, and a fiber-reinforced composite material, which can be molded at a low temperature and a low pressure, have sufficient heat resistance and mechanical properties for practical use, and enable significant reduction of manufacturing costs.

As a result of diligent research, the present inventors arrived at a resin composition obtained by blending specific amounts of (a) one or more epoxy resins, (b) an aromatic diamine compound, (c) a dicyandiamide, (d) a urea compound, and (e) an amine adduct compound.

The present technology provides an epoxy resin composition for a fiber-reinforced composite material, including: (a) one or more epoxy resins; (b) an aromatic diamine compound; (c) a dicyandiamide; (d) a urea compound; and (e) an amine adduct compound, blended in the following blending proportions:
  a blending proportion of the (b) aromatic diamine compound being from 0.2 to 0.6 equivalents relative to the (a) epoxy resin,
  a blending proportion of the (c) dicyandiamide being from 0.5 to 4.0 mass % relative to a total of the (a) to (e) components,
  a blending proportion of the (d) urea compound being from 0.5 to 2.0 mass % relative to the total of the (a) to (e) components, and
  a blending proportion of the (e) amine adduct compound being 0 to 3.0 mass % relative to the total of the (a) to (e) components.

The epoxy resin composition for a fiber-reinforced composite material (hereinafter, simply referred to as resin composition) according to an embodiment of the present technology includes (a) one or more epoxy resins, (b) an aromatic diamine compound, (c) a dicyandiamide, (d) a urea compound, and (e) an amine adduct compound, blended in specific amounts, and thus can be molded at a low temperature and a low pressure, has sufficient heat resistance and mechanical properties for practical use, and enables significant reduction of a manufacturing cost.

In particular, for the resin composition according to an embodiment of the present technology, the process currently divided into curing at 120° C. and curing at 180° C. can be unified into curing at 120° C. on a low temperature side. For example, when the prepreg in an embodiment of the present technology is cured by an autoclave under low temperature/low pressure conditions (for example, at 120° C., for 90 minutes, and at 0.31 MPa), FRPs having heat resistance and mechanical properties equivalent to those of 120° C.-cured products of the prior art can be obtained. It is also possible to obtain FRPs having heat resistance and mechanical properties equivalent to those of 180° C.-cured products of the prior art by subjecting the cured products to post-curing (e.g., at 180° C., for 2 hours, and at atmospheric pressure). The post-curing does not require pressurization using an autoclave, and, for example, only heat may be applied using an air-circulating oven or the like. Therefore, when 180° C.-cured products are manufactured, auxiliary materials required at the time of curing at 180° C. by an autoclave are also unnecessary, and the manufacturing cost when an autoclave is used can be reduced. In addition, at the time of post-curing, products can be demolded from a layering jig and heated in a free-standing state, and thus improvement in productivity due to shortening of a mold occupancy time can be achieved. According to the prepreg in an embodiment of the present technology, 180° C.-cured products can be manufactured using an autoclave. Also in this case, cured products having molding quality, heat resistance, and mechanical properties equivalent to those of 180° C.-cured products of the prior art can be obtained.

As further described above, in accordance with the present technology, in a case where a 120° C.-cured product is manufactured and also in a case where a 180° C.-cured product is manufactured, a 120° C.-cured product can be manufactured first. Thus, it is unnecessary to provide materials corresponding to the cured products as in the prior art, and also to store and manage the cured products, and the manufacturing cost can be reduced.

From the above, the present technology can provide an epoxy resin composition for a fiber-reinforced composite material, a prepreg, and a fiber-reinforced composite material, which can be molded at a low temperature and a low pressure, have sufficient heat resistance and mechanical properties for practical use, and enable significant reduction of manufacturing costs.

DETAILED DESCRIPTION

The present technology will be described in further detail below.

The epoxy resin composition according to an embodiment of the present technology includes: (a) one or more epoxy resins; (b) an aromatic diamine compound; (c) a dicyandiamide; (d) a urea compound; and (e) an amine adduct compound, blended in the following blending proportions:
  a blending proportion of the (b) aromatic diamine compound being from 0.2 to 0.6 equivalents relative to the (a) epoxy resin,
  a blending proportion of the (c) dicyandiamide being from 0.5 to 4.0 mass % relative to a total of the (a) to (e) components,
  a blending proportion of the (d) urea compound being from 0.5 to 2.0 mass % relative to the total of the (a) to (e) components, and
  a blending proportion of the (e) amine adduct compound being 0 to 3.0 mass % relative to the total of the (a) to (e) components.

(a) Epoxy Resin

In a suitable form, all of the (a) epoxy resins can be composed of trifunctional or higher functional epoxy resins. Alternatively, a bifunctional epoxy resin may be used in combination as the (a) epoxy resins. In this case, the (a) epoxy resins are preferably composed of: from 0 to 80 mass % of a bifunctional epoxy resin; and from 20 to 100 mass % of a trifunctional or higher functional epoxy resin.

Examples of the trifunctional or higher functional epoxy resin include polyfunctional type glycidyl ether epoxy resins such as phenol novolac type, orthocresol novolac type, trishydroxyphenylmethane type, and tetraphenylolethane type, and glycidylamine epoxy resins such as a tetraglycidyldiamino diphenylmethane, tetraglycidyl-m-xylylenediamine, triglycidyl-p-aminophenol, and triglycidyl-m-aminophenol.

The trifunctional or higher functional epoxy resin is preferably a liquid or semi-solid epoxy resin from the perspective of having higher heat resistance, more appropriate viscosity, and excellent workability (for example, impregnation property into a fiber base material).

A single trifunctional or higher functional epoxy resin can be used, or two or more trifunctional or higher functional epoxy resins can be used in combination.

Examples of the bifunctional epoxy resin include epoxy compounds with bisphenol groups, such as bisphenol A type, bisphenol F type, brominated bisphenol A type, hydrogenated bisphenol A type, bisphenol S type, bisphenol AF type, and biphenyl type; polyalkylene glycol type and alkylene glycol type epoxy compounds; epoxy compounds with naphthalene rings; and epoxy compounds with fluorene groups.

A single bifunctional epoxy resin can be used, or two or more bifunctional epoxy resins can be used in combination.

(b) Aromatic Diamine Compound

The (b) aromatic diamine compound has an effect of curing the (a) epoxy resin. The (b) aromatic diamine compound used in an embodiment of the present technology is not particularly limited as long as it has the effect described above, but is preferably one or more selected from the group consisting of 3,3'-diaminodiphenylsulfone, 4,4'-diaminodiphenylsulfone, 4,4'-methylenebis(2,6-diethylaniline) and 4,4'-methylenebis(2-ethyl-6-methyl)benzeneamine, from the perspective of improving the effects of the present technology.

Structures of these suitable (b) aromatic diamine compounds will be shown below.

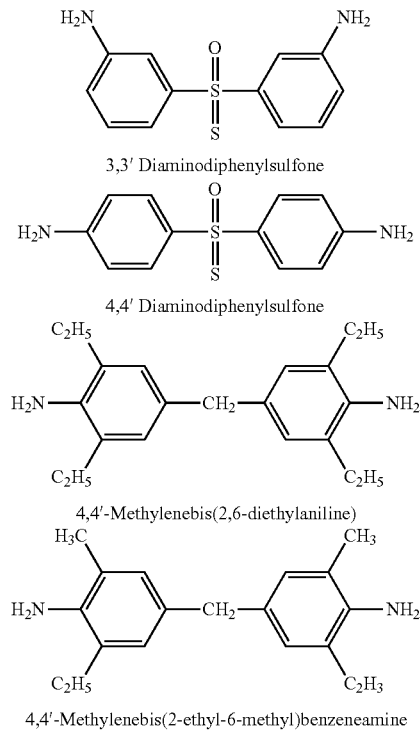

In the resin composition according to an embodiment of the present technology, the blending proportion of the (b) aromatic diamine compound is from 0.2 to 0.6 equivalents relative to the (a) epoxy resin. When the blending proportion falls outside the range, heat resistance deteriorates. A preferred blending proportion of the (b) aromatic diamine compound is from 0.3 to 0.5 equivalents relative to the (a) epoxy resin.

(c) Dicyandiamide

The (c) dicyandiamide has the effect of curing the (a) epoxy resin and has the following structure.

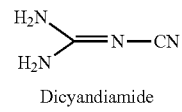

Dicyandiamide

In the resin composition according to an embodiment of the present technology, the blending proportion of the (c) dicyandiamide is from 0.5 to 4.0 mass % relative to the total of the (a) to (e) components. When the blending proportion falls outside this range, heat resistance deteriorates, or curability at low temperatures, such as 120° C., deteriorates. A preferred blending proportion of the (c) dicyandiamide is from 1.0 to 3.0 mass % relative to the total of the (a) to (e) components.

(d) Urea Compound

The (d) urea compound has an effect of promoting a curing reaction of the (a) epoxy resin. The (d) urea compound used in an embodiment of the present technology is not particularly limited as long as it has the effect described above, but is preferably one or more selected from the group consisting of 3-(3,4'-dichlorophenyl)-1,1-dimethylurea, 2,4-toluenebisdimethylurea, and 4,4'-methylenebis(phenyldimethylurea).

Structures of these suitable (d) urea compounds will be shown below.

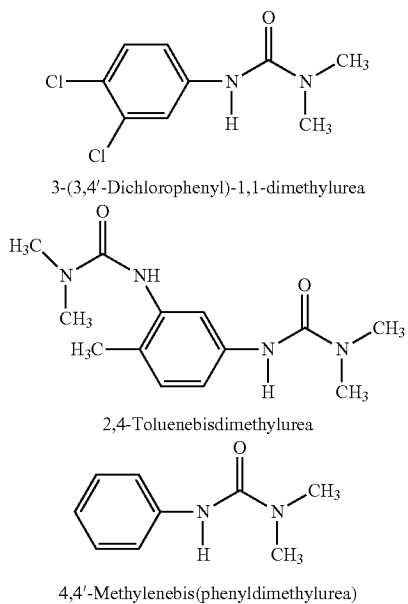

3-(3,4'-Dichlorophenyl)-1,1-dimethylurea 2,4-Toluenebisdimethylurea 4,4'-Methylenebis(phenyldimethylurea)

In the resin composition according to an embodiment of the present technology, the blending proportion of the (d) urea compound is from 0.5 to 2.0 mass % relative to the total of the (a) to (e) components. When the blending proportion falls outside this range, heat resistance or curability deteriorates. A preferred blending proportion of the (d) urea compound is from 0.5 to 1.5 mass % relative to the total of the (a) to (e) components.

(e) Amine Adduct Compound

The (e) amine adduct compound has the effect of promoting the curing reaction of the (a) epoxy resin. The (e) amine adduct compound is an adduct of an amine, such as an adduct of an amine and at least one compound selected from the group consisting of an epoxy resin, an isocyanate compound, and a urea compound.

The amine may have, for example, one or more active hydrogens capable of performing an addition reaction with an epoxy group, a phenol group, or an isocyanate group in one molecule, and have one or more of at least one selected from the group consisting of a primary amino group, a secondary amino group, and a tertiary amino in one molecule. Specific examples of the amine include 2-methylimidazole, N-methylimidazole, 2-ethyl-4-methylimidazole, N-methylpiperazine, 2,4,6-tris(dimethylaminomethyl)phenol, 2-dimethylaminoethanol, 2-undecylimidazolol, 2-phenylimidazole, and 2-octadecylimidazole.

The epoxy resin is not particularly limited. Examples of the epoxy resin include polyglycidyl ethers obtained by reacting a polyhydric phenol such as bisphenol A, bisphenol F, bisphenol AD, catechol, or resorcinol, or a polyhydric alcohol such as glycerin or polyethylene glycol with epichlorohydrin; glycidyl ether esters obtained by reacting a hydroxycarboxylic acid such as p-hydroxybenzoic acid or β-hydroxynaphthoic acid with epichlorohydrin; polyglycidyl esters obtained by reacting a polycarboxylic acid such as phthalic acid or terephthalic acid with epichlorohydrin; epoxidized phenol novolac resins, epoxidized cresol novolac resins, epoxidized polyolefins, cyclic aliphatic epoxy resins, urethane-modified epoxy resins, and glycidylamine type epoxy resins obtained from 4,4 diaminodiphenylmethane, m-aminophenol, or the like.

The isocyanate compound is not particularly limited. Examples of the isocyanate compound include monofunctional isocyanate compounds such as n-butyl isocyanate, phenyl isocyanate, and hexamethylene diisocyanate; and polyfunctional compounds such as hexamethylene diisocyanate, toluylene diisocyanate, 1,5-naphthalene diisocyanate, isophorone diisocyanate, xylylene diisocyanate, and 1,3,6-hexamethylene triisocyanate.

The urea compound is not particularly limited as long as it is a compound having at least one selected from the group consisting of a ureido bond, a urethane bond, and NH—CO—N. Examples of the urea compound include urea, urea phosphate, urea oxalate, urea acetate, diacetyl urea, dibenzoyl urea, and trimethyl urea.

In the resin composition according to an embodiment of the present technology, the blending proportion of the (e) amine adduct compound is from 0 to 3.0 mass % relative to the total of the (a) to (e) components. When the blending proportion of the (e) amine adduct compound is greater than 3.0 mass %, the balance in curability of the resin is lost, and the low-temperature curability at 120° C. deteriorates, or the heat resistance of the cured product worsens. A preferred blending proportion of the (e) amine adduct compound is from 0 to 2 mass % relative to the total of the (a) to (e) components.

The resin composition according to an embodiment of the present technology may additionally contain an additive depending on an intended use without departing from the object of the present technology. Examples of components that can be added include flame retardants, thermoplastic resins and rubbers for improving toughness of cured resins, and inorganic particles for controlling resin fluidity and improving resin rigidity during curing.

The resin composition according to an embodiment of the present technology has excellent curability. For example, the resin composition can be cured under the curing conditions: at 120° C. and for 1.5 hours, until a state where it can be demolded from the mold. The obtained cured product has a glass transition temperature of 110° C. or higher, and has high heat resistance. The resin composition according to an embodiment of the present technology has a reaction start temperature (exothermic peak onset temperature) of 90° C. or higher and 120° C. or lower according to differential scanning calorimetry (DSC analysis) at a temperature increase rate of 10° C./min, and thus curing at 120° C. reliably proceeds.

Note that the glass transition temperature referred to herein is measured by thermomechanical analysis (TMA), and specific conditions for the analysis are as follows.

Device used: TMA 4000S Thermomechanical Analyzer available from Bruker AXS

Temperature increase rate: 10° C./min

Measurement mode: expansion mode

Load applied: 2 g

Measurement atmosphere: air

Specific conditions for the DSC analysis are as follows.

Device used: DSC2500 Differential Scanning Calorimeter available from TA Instruments Temperature increase rate: 10° C./min Measurement atmosphere: nitrogen gas In addition, in an embodiment of the present technology, a cured product having heat resistance and mechanical properties equivalent to those of 180° C.-cured products of the prior art can be formed by subjecting the cured product to post-curing (for example, at 180° C., for 2 hours, and atmospheric pressure). The post-curing does not require pressurization using an autoclave, and, for example, only heat may be applied using an air-circulating oven or the like. Therefore, auxiliary materials required at the time of curing at 180° C. by an autoclave are also unnecessary, and the manufacturing cost when an autoclave is used can be reduced. In addition, at the time of post-curing, products can be demolded from a layering jig and heated in a free-standing state, and thus improvement in productivity due to shortening of a mold occupancy time can be achieved.

The cured product after this post-curing has a glass transition temperature of 180° C. or higher, and has high heat resistance.

The prepreg according to an embodiment of the present technology is obtained using the resin composition according to an embodiment of the present technology and a fiber base material.

Specifically, the prepreg according to an embodiment of the present technology is obtained by impregnating the resin composition according to an embodiment of the present technology into a fiber base material.

The fiber base material used in the prepreg according to an embodiment of the present technology is not particularly limited, but, for example, is preferably any of glass fiber, quartz fiber, aramid fiber, or carbon fiber. Examples of a form of the fiber base material include woven fabrics, roving, nonwoven fabrics, knit fabrics, and tulle.

A method for manufacturing the prepreg according to an embodiment of the present technology is not particularly limited. Examples of the method include dipping methods using a solvent and hot melt methods (solvent-free methods).

The fiber-reinforced composite material according to an embodiment of the present technology is a cured product of the prepreg according to an embodiment of the present technology. An intended use of the fiber-reinforced composite material according to an embodiment of the present technology is not particularly limited, and examples thereof include aircraft parts (e.g., radomes, fairings, flaps, leading edges, floor panels, propellers, fuselages, and the like); two-wheel vehicle parts (e.g., motorcycle frames, cowls, fenders, and the like); automobile parts (e.g., doors, bonnets, tailgates, side fenders, side panels, fenders, energy absorbers, trunk lids, hard tops, side mirror covers, spoilers, diffusers, ski carriers, engine cylinder covers, engine hoods, chassis, air spoilers, propeller shafts, and the like); vehicle exterior plating (e.g., lead car noses, roofs, side panels, doors, truck bed covers, side skirts, and the like); railroad vehicle parts (e.g., luggage racks, seats, and the like); aero parts (e.g., side skirts and the like mounted on automobiles and rigid vehicles such as interior design elements, inner panels, outer panels, roofs, and floors of wings on wing trucks, and the like); use as housings (e.g., notebook computers, portable phones, and the like); medical uses (e.g., X-ray cassettes, table tops, and the like); audio product uses (e.g., flat speaker panels, speaker cones, and the like); sports goods uses (e.g., golf club heads, face masks, snowboards, surf boards, protectors, and the like); and general industrial uses (e.g., flat springs, windmill blades, and elevators (compartment panels, doors).

EXAMPLE

The present technology will be described in further detail by way of examples and comparative examples, but the present technology is not limited by these examples.

Examples 1 to 4 and Comparative Examples 1 to 8

In the examples and comparative examples, the following materials were used.

(a) Epoxy Resin

Trifunctional or higher functional epoxy resin (YH-404 available from NIPPON STEEL Chemical & Material Co., Ltd., epoxy equivalent=115)

Trifunctional or higher functional epoxy resin (MY-0510 available from Huntsman Advanced Material, epoxy equivalent=101)

Trifunctional or higher functional epoxy resin (V G3101 L available from Printech co., ltd., epoxy equivalent=210)

Bifunctional epoxy resin (YD-128 available from NIPPON STEEL Chemical & Material Co., Ltd., epoxy equivalent=191)

Bifunctional epoxy resin (HP-4032SS available from DIC Corporation, epoxy equivalent=143)

Bifunctional epoxy resin (EpoxMKSR35K available from Printech co., ltd., epoxy equivalent=962)

(b) Aromatic Diamine 4,4'-Diaminodiphenylsulfone (available from Wakayama Seika Kogyo Co., Ltd.)

(c) Dicyandiamide

Dicyandiamide (Dicy 15 available from Mitsubishi Chemical Corporation)

(d) Urea Compound 4,4'-Methylenebis(phenyl dimethylurea) (Omicure U-24M available from CV C Thermoset Specialities)

(e) Amine Adduct Compound

Amine-epoxy adduct compound (PN-40J available from Ajinomoto Fine-Techno Co., Inc.)

According to the blending proportions (parts by mass) listed in Table 1 below, the materials were kneaded by using a kneader, and thus each resin composition was prepared.

Next, the prepared resin composition was poured into a die having dimensions of 200 mm×200 mm×3 mm, and then heated under conditions: at 120° C. and for 1.5 hours, and a 120° C.-cured product was attempted to be manufactured. Table 1 shows whether curing is possible, the appearance of the resultant cured product, and the glass transition temperature thereof. Note that a part of the resin cured product was cut into approximately 3 mm square, and that the glass transition temperature was measured by the method described above.

Next, the 120° C.-cured product was subjected to post-curing at 180° C. for 3 hours, and a 180° C.-cured product was manufactured. Note that this post-curing was performed by heating the resin cured product under atmospheric pressure using an air-circulating oven in a free-standing state without using a die. The appearance and glass transition temperature of the resultant cured product were examined.

The results are shown in Table 1.

The following mechanical properties were measured for the 120° C.-cured product and the 180° C.-cured product obtained above.

Tensile strength (measured in accordance with ASTM D638)

Tensile elastic modulus (measured in accordance with ASTM D638)

Tensile elongation (measured in accordance with ASTM D638)

Bending strength (measured in accordance with ASTMD790)

Bending elastic modulus (measured in accordance with ASTM D790)

Bending elongation (measured in accordance with ASTM D790)

Tensile toughness (calculated from load-strain curve in tensile test)

Bending toughness (calculated from load-strain curve in bending test) The results are shown in Table 2.

TABLE 1

| Blended Components | Product name | Equivalent | Example 1 | Example 2 | Example 3 |
|---|---|---|---|---|---|
| (a) Trifunctional or higher functional epoxy resin | YH-404 | 115 | 40 | 70 | 60 |
| | MY-0510 | 101 | 0 | 0 | 0 |
| | VG3101L | 210 | 30 | 0 | 0 |
| (a) Bifunctional epoxy resin | YD-128 | 191 | 30 | 0 | 0 |
| | HP-4032SS | 143 | 0 | 30 | 30 |
| | EpoxMKSR35K | 962 | 0 | 0 | 10 |
| Trifunctional or higher functional epoxy/bifunctional epoxy ratio | | 0 | 70/30 | 70/30 | 60/40 |
| (b) Aromatic diamine compound | 4,4'-DDS | 63 | 16.3 | 25.8 | 18.7 |
| (c) Dicyandiamide | Dicy 15 | — | 2.0 | 1.0 | 2.0 |
| (d) Urea compound | OmicureU-24M | — | 1.0 | 1.0 | 1.0 |
| (e) Amine adduct compound | PN-40J | — | 1.0 | 1.0 | 1.0 |
| Blending total | | (phr) | 120.3 | 128.8 | 122.7 |
| (b) Equivalent ratio | Equivalent ratio relative to (a) | | 0.4 | 0.5 | 0.4 |
| (c) Blending proportion | wt. % relative to total of (a) to (e) | | 1.66 | 0.78 | 1.63 |
| (d) Blending proportion | wt. % relative to total of (a) to (e) | | 0.83 | 0.78 | 0.82 |
| (e) Blending proportion | wt. % relative to total of (a) to (e) | | 0.83 | 0.78 | 0.82 |
| Reaction temperature | Start temperature | ° C. | 98 | 96 | 90 |
| (DSC exothermic peak) | Onset temperature | ° C. | 124 | 146 | 124 |
| Cured state | 120° C.-cured product | Whether curing is possible | Possible | Possible | Possible |
| | 120° C.-cured product | Appearance | Transparent | | Slightly cloudy |
| | 180° C.-cured product | Whether curing is possible | Possible | Possible | Possible |
| | 180° C.-cured product | Appearance | Transparent | | Slightly cloudy |
| Glass transition temperature | 120° C.-cured product | ° C. | 135 | 118 | 138 |
| | 180° C.-cured product | ° C. | 189 | 182 | 182 |

| Blended Components | Product name | Equivalent | Example 4 | Comparative Example 1 | Comparative Example 2 |
|---|---|---|---|---|---|
| (a) Trifunctional or higher functional epoxy resin | YH-404 | 115 | 35 | 100 | 0 |
| | MY-0510 | 101 | 30 | 0 | 0 |
| | VG3101L | 210 | 0 | 0 | 0 |
| (a) Bifunctional epoxy resin | YD-128 | 191 | 0 | 0 | 100 |
| | HP-4032SS | 143 | 30 | 0 | 0 |
| | EpoxMKSR35K | 962 | 5 | 0 | 0 |
| Trifunctional or higher functional epoxy/bifunctional epoxy ratio | | 0 | 65/35 | 100/0 | 0/100 |
| (b) Aromatic diamine compound | 4,4'-DDS | 63 | 20.6 | 38.3 | 23.1 |
| (c) Dicyandiamide | Dicy 15 | — | 2.0 | 0.0 |
| (d) Urea compound | OmicureU-24M | — | 1.0 | 0.0 | 0.0 |
| (e) Amine adduct compound | PN-40J | — | 0.0 | 0.0 | 0.0 |

TABLE 1-continued

| Blended Components | | | | | |
|---|---|---|---|---|---|
| Blending total | | (phr) | 123.6 | 138.3 | 123.1 |
| (b) Equivalent ratio | Equivalent ratio relative to (a) | | 0.4 | 0.7 | 0.7 |
| (c) Blending proportion | wt. % relative to total of (a) to (e) | | 1.62 | 0.00 | 0.00 |
| (d) Blending proportion | wt. % relative to total of (a) to (e) | | 0.81 | 0.00 | 0.00 |
| (e) Blending proportion | wt. % relative to total of (a) to (e) | | 0.00 | 0.00 | 0.00 |
| Reaction temperature | Start temperature | °C. | 104 | 154 | 132 |
| (DSC exothermic peak) | Onset temperature | °C. | 132 | 203 | 179 |
| Cured state | 120° C.-cured product | Whether curing is possible | Possible | Not possible | Not possible |
| | 120° C.-cured product | Appearance | | | |
| | 180° C.-cured product | Whether curing is possible | Possible | Possible | Possible |
| | 180° C.-cured product | Appearance | | Transparent | Transparent |
| Glass transition temperature | 120° C.-cured product | °C. | 136 | — | — |
| | 180° C.-cured product | °C. | 183 | 220 | 115 |

| Blended Components | Product name | Equivalent | Comparative Example 3 | Comparative Example 4 | Comparative Example 5 |
|---|---|---|---|---|---|
| (a) Trifunctional or higher functional epoxy resin | YH-404 | 115 | 60 | 100 | 100 |
| | MY-0510 | 101 | 0 | 0 | 0 |
| | VG3101L | 210 | 0 | 0 | 0 |
| (a) Bifunctional epoxy resin | YD-128 | 191 | 0 | 0 | 0 |
| | HP-4032SS | 143 | 30 | 0 | 0 |
| | EpoxMKSR35K | 962 | 10 | 0 | 0 |
| Trifunctional or higher functional epoxy/bifunctional epoxy ratio | 0 | 0 | 60/40 | 100/0 | 100/0 |
| (b) Aromatic diamine compound | 4,4'-DDS | 63 | 14.0 | 21.9 | 21.9 |
| (c) Dicyandiamide | Dicy 15 | — | 5.0 | 2.0 | 2.0 |
| (d) Urea compound | OmicureU-24M | — | 1.0 | 0.0 | 0.0 |
| (e) Amine adduct compound | PN-40J | — | 1.0 | 2.0 | 3.0 |
| Blending total | | (phr) | 121.0 | 125.9 | 126.9 |
| (b) Equivalent ratio | Equivalent ratio relative to (a) | | 0.3 | 0.4 | 0.4 |
| (c) Blending proportion | wt. % relative to total of (a) to (e) | | 4.13 | 1.59 | 1.58 |
| (d) Blending proportion | wt. % relative to total of (a) to (e) | | 0.83 | 0.00 | 0.00 |
| (e) Blending proportion | wt. % relative to total of (a) to (e) | | 0.83 | 1.59 | 2.36 |
| Reaction temperature | Start temperature | °C. | 105 | 94 | 88 |
| (DSC exothermic peak) | Onset temperature | °C. | 129 | 153 | 116 |
| Cured state | 120° C.-cured product | Whether curing is possible | Possible | Not possible | Not possible |
| | 120° C.-cured product | Appearance | | Slightly suspended | Slightly suspended |
| | 180° C.-cured product | Whether curing is possible | Possible | Possible | Possible |
| | 180° C.-cured product | Appearance | | Slightly suspended | Slightly suspended |
| Glass transition temperature | 120° C.-cured product | °C. | 118 | — | — |
| | 180° C.-cured product | °C. | 156 | 205 | 204 |

| Blended Components | Product name | Equivalent | Comparative Example 6 | Comparative Example 7 | Comparative Example 8 |
|---|---|---|---|---|---|
| (a) Trifunctional or higher functional epoxy resin | YH-404 | 115 | 100 | 100 | 60 |
| | MY-0510 | 101 | | 0 | 0 |
| | VG3101L | 210 | | 0 | 0 |
| (a) Bifunctional epoxy resin | YD-128 | 191 | | 0 | 0 |
| | HP-4032SS | 143 | | 0 | 30 |
| | EpoxMKSR35K | 962 | | 0 | 10 |
| Trifunctional or higher functional epoxy/bifunctional epoxy ratio | | 0 | 100/0 | 100/0 | 60/40 |

TABLE 1-continued

| | | | | | |
|---|---|---|---|---|---|
| (b) Aromatic diamine compound | 4,4'-DDS | | 63 | 32.9 | 32.7 |
| (c) Dicyandiamide | Dicy 15 | | — | 2.0 | 1.0 |
| (d) Urea compound | OmicureU-24M | | — | 1.0 | 1.0 |
| (e) Amine adduct compound | PN-40J | | — | 1.0 | 1.0 |
| | | | | 9.9 | |
| Blending total | | (phr) | 104.0 | 142.8 | 135.7 |
| (b) Equivalent ratio | Equivalent ratio relative to (a) | | 0.0 | 0.6 | 0.7 |
| (c) Blending proportion | wt. % relative to total of (a) to (e) | | 1.92 | 0.00 | 0.74 |
| (d) Blending proportion | wt. % relative to total of (a) to (e) | | 0.96 | 0.00 | 0.74 |
| (e) Blending proportion | wt. % relative to total of (a) to (e) | | 0.96 | 6.94 | 0.74 |
| Reaction temperature | Start temperature | °C. | 110 | 98 | 100 |
| (DSC exothermic peak) | Onset temperature | °C. | 147 | 124 | 151 |
| Cured state | 120° C.-cured product | Whether curing is possible | Possible | Not possible | Possible |
| | 120° C.-cured product | Appearance | | Uncured in center portion | |
| | 180° C.-cured product | Whether curing is possible | Possible | Possible | Possible |
| | 180° C.-cured product | Appearance | | Uneven when defoaming | |
| Glass transition temperature | 120° C.-cured product | °C. | 108 | 48 | 115 |
| | 180° C.-cured product | °C. | 161 | 166 | 134 |

TABLE 2

| Item | | Unit | Example 1 | Example 2 | Example 3 | Example 4 |
|---|---|---|---|---|---|---|
| Tensile strength | 120° C.-cured product | (MPa) | 59 | 64 | 70 | 80 |
| Tensile elastic modulus | 120° C.-cured product | [GPa] | 4.0 | 4.1 | 4.1 | 4.1 |
| Tensile elongation | 120° C.-cured product | (%) | 1.7 | 1.7 | 1.9 | 2.3 |
| Tensile strength | 180° C.-cured product | (MPa) | 31 | 53 | 42 | 41 |
| Tensile elastic modulus | 180° C.-cured product | [GPa] | 3.2 | 3.5 | 3.5 | 3.5 |
| Tensile elongation | 180° C.-cured product | (%) | 1.0 | 1.7 | 1.3 | 1.3 |
| Bending strength | 120° C.-cured product | (MPa) | 139 | 167 | 157 | 162 |
| Bending elastic modulus | 120° C.-cured product | [GPa] | 3.9 | 4.3 | 4.1 | 4.2 |
| Bending elongation | 120° C.-cured product | (%) | 4.1 | 4.4 | 4.6 | 4.5 |
| Bending strength | 180° C.-cured product | (MPa) | 113 | 158 | 148 | 153 |
| Bending elastic modulus | 180° C.-cured product | [GPa] | 3.3 | 3.5 | 3.5 | 3.4 |
| Bending elongation | 180° C.-cured product | (%) | 4.0 | 5.9 | 5.5 | 6.4 |
| Tensile toughness | 120° C.-cured product | [kgf-mm/mm2] | 1546 | 1224 | 2152 | 4146 |
| | 180° C.-cured product | [kgf-mm/mm2] | 371 | 1055 | 651 | 748 |
| Bending toughness | 120° C.-cured product | [kgf-mm/mm2] | 1126 | 1302 | 1343 | 1337 |
| | 180° C.-cured product | [kgf-mm/mm2] | 870 | 1768 | 1511 | 1963 |

TABLE 2-continued

| Item | | Unit | Comparative Example 1 | Comparative Example 2 | Comparative Example 3 |
|---|---|---|---|---|---|
| Tensile strength | 120° C.-cured product | (MPa) | 0 | 0 | 71 |
| Tensile elastic modulus | 120° C.-cured product | [GPa] | 0.0 | 0.0 | 4.1 |
| Tensile elongation | 120° C.-cured product | (%) | | | 2.0 |
| Tensile strength | 180° C.-cured product | (MPa) | 43 | 45 | 42 |
| Tensile elastic modulus | 180° C.-cured product | [GPa] | 4.0 | 4.0 | 3.6 |
| Tensile elongation | 180° C.-cured product | (%) | 1.2 | 1.2 | 1.3 |
| Bending strength | 120° C.-cured product | (MPa) | 0 | 0 | 182 |
| Bending elastic modulus | 120° C.-cured product | [GPa] | | | 4.2 |
| Bending elongation | 120° C.-cured product | (%) | 0.0 | 0.0 | 5.7 |
| Bending strength | 180° C.-cured product | (MPa) | 151 | 167 | 159 |
| Bending elastic modulus | 180° C.-cured product | [GPa] | 3.8 | 4.0 | 3.7 |
| Bending elongation | 180° C.-cured product | (%) | 4.8 | 6.1 | 6.0 |
| Tensile toughness | 120° C.-cured product | [kgf-mm/mm2] | 0 | 0 | 1835 |
| | 180° C.-cured product | [kgf-mm/mm2] | 744 | 842 | 692 |
| Bending toughness | 120° C.-cured product | [kgf-mm/mm2] | 0 | 0 | 1844 |
| | 180° C.-cured product | [kgf-mm/mm2] | 1312 | 2153 | 1699 |

From the results shown in Tables 1 and 2, it was confirmed that, in each of the examples, the resin composition was well cured at 120° C., and that the resultant cured product also had sufficient heat resistance and mechanical properties for practical use. Furthermore, it was confirmed that the 180° C.-cured product obtained by subjecting the 120° C.-cured product to post-curing at 180° C. also had sufficient heat resistance and mechanical properties for practical use.

In contrast, in Comparative Examples 1 and 2, neither the (c) dicyandiamide nor the (d) urea compound, according to an embodiment of the present technology, was blended, and thus curing at 180° C. could be confirmed, but curing at 120° C. could not be confirmed.

In Comparative Example 3, the blending proportion of the (c) component exceeded the upper limit specified in an embodiment of the present technology, and thus the heat resistance of the 180° C.-cured product worsened.

Only the degree of curing was confirmed in Comparative Examples 4 to 8, and the results are shown in Table 1.

The invention claimed is:

1. An epoxy resin composition for a fiber-reinforced composite material, comprising:
   (a) one or more epoxy resins;
   (b) an aromatic diamine compound;
   (c) a dicyandiamide;
   (d) a urea compound; and
   (e) an amine adduct compound,
   blended in the following blending proportions:
   a blending proportion of the (b) aromatic diamine compound being from 0.2 to 0.6 equivalents relative to the (a) epoxy resin,
   a blending proportion of the (c) dicyandiamide being from 0.5 to 4.0 mass % relative to a total of the (a) to (e) components,
   a blending proportion of the (d) urea compound being from 0.5 to 2.0 mass % relative to the total of the (a) to (e) components, and
   a blending proportion of the (e) amine adduct compound being from greater than 0 mass % to 3.0 mass % relative to the total of the (a) to (e) components, wherein
   a glass transition temperature of a cured product is 110° C. or higher, the cured product being obtained by curing the resin composition under curing conditions: at 120° C. and for 1.5 hours, until a state where demolding from a mold can be performed.

2. The epoxy resin composition for a fiber-reinforced composite material according to claim 1, wherein the cured product has a glass transition temperature of 180° C. or higher by post-curing at 180° C. for 2 hours.

3. The epoxy resin composition for a fiber-reinforced composite material according to claim 1, wherein the (a) epoxy resin comprises from 0 to 80 mass % of a bifunctional epoxy resin and from 20 to 100 mass % of a trifunctional or higher functional epoxy resin.

4. The epoxy resin composition for a fiber-reinforced composite material according to claim 1, wherein a reaction start temperature (exothermic peak onset temperature) according to differential scanning calorimetry (DSC analysis) at a temperature increase rate of 10° C./min is 90° C. or higher and 120° C. or lower.

5. The epoxy resin composition for a fiber-reinforced composite material according to claim 1, wherein the (b) aromatic diamine compound is one or more selected from the group consisting of 3,3'-diaminodiphenylsulfone, 4,4'-diaminodiphenylsulfone, 4,4'-methylenebis(2,6-diethylaniline) and 4,4'-methylenebis(2-ethyl-6-methyl)benzeneamine.

6. The epoxy resin composition for a fiber-reinforced composite material according to claim 1, wherein the (d) urea compound is one or more selected from the group consisting of 3-(3,4'-dichlorophenyl)-1,1-dimethylurea, 2,4-toluenebisdimethylurea, and 4,4'-methylenebis(phenyldimethylurea).

7. The epoxy resin composition for a fiber-reinforced composite material according to claim 1, wherein the blending proportion of the (b) aromatic diamine compound is from 0.3 to 0.5 equivalents relative to the (a) epoxy resin.

8. The epoxy resin composition for a fiber-reinforced composite material according to claim 1, wherein the blending proportion of the (c) dicyandiamide is from 1.0 to 3.0 mass % relative to the total of the (a) to (e) components.

9. The epoxy resin composition for a fiber-reinforced composite material according to claim 1, wherein the blending proportion of the (d) urea compound is from 0.5 to 1.5 mass % relative to the total of the (a) to (e) components.

10. The epoxy resin composition for a fiber-reinforced composite material according to claim 1, wherein the blending proportion of the (e) amine adduct compound is from greater than 0 mass % to 2 mass % relative to the total of the (a) to (e) components.

11. A prepreg comprising the epoxy resin composition for a fiber-reinforced composite material according to claim 1, the epoxy resin composition being impregnated into any of glass fiber, quartz fiber, aramid fiber, or carbon fiber.

12. A fiber-reinforced composite material according to claim 11, which is a cured product of the prepreg.

* * * * *